United States Patent [19]

Himes

[11] 3,870,126
[45] Mar. 11, 1975

[54] CART STOP STRUCTURE FOR AN ELEVATOR

[75] Inventor: William H. Himes, Dayton, Ohio

[73] Assignee: Leyman Manufacturing Corporation, Cincinnati, Ohio

[22] Filed: July 18, 1973

[21] Appl. No.: 380,170

[52] U.S. Cl. .............................. 187/8.52, 214/75 T
[51] Int. Cl. ............................................. B60p 3/06
[58] Field of Search .......... 187/1 R, 8.52; 214/75 R, 214/75 T

[56] References Cited
UNITED STATES PATENTS

| | | | |
|---|---|---|---|
| 1,796,557 | 3/1931 | Bristol | 187/8.52 |
| 1,943,003 | 1/1934 | Cochin | 187/8.52 |
| 2,098,376 | 11/1937 | Cunneen | 187/8.52 |
| 2,530,341 | 11/1950 | Satsky | 214/75 T |
| 3,216,530 | 11/1965 | Hunter | 187/8.52 |
| 3,233,767 | 2/1966 | Goodacre | 187/8.52 |
| 3,672,523 | 6/1972 | Albert | 187/8.52 |

FOREIGN PATENTS OR APPLICATIONS

| | | | |
|---|---|---|---|
| 1,010,856 | 11/1965 | Great Britain | 214/75 T |
| 1,120,502 | 7/1956 | France | 214/75 T |

Primary Examiner—Robert B. Reeves
Assistant Examiner—Hadd Lane
Attorney, Agent, or Firm—Wood, Herron & Evans

[57] ABSTRACT

A cart stop structure for an elevator of the type particularly adapted for mounting at the rear end of a cargo trailer. Two separate chocks are permanently connected to the elevator's platform, the platform being wide enough to accommodate three carts side by side (as opposed to end to end) across its width. The chocks are movable between a storage position either dropped flush with the platform's floor or pivoted adjacent the platform's side walls (depending on the specific structural embodiment used) so the carts may be easily rolled onto or off the elevator platform, and an operative position adjacent the platform's free edge in linear relation one with the other where carts on the platform are prevented from rolling off the platform during raising and lowering of the platform. Each chock is of a length sufficient to block both wheels of that cart adjacent its related side of the platform as well as one wheel of the cart in the center of the platform. This allows one side cart and the center cart on the platform to remain chocked while the other side cart is being removed, thereafter allows that one side cart to be removed while the center cart remains chocked, and thereafter allows the center cart to be removed, during unloading simply by manipulating the two chocks in a set sequence.

9 Claims, 13 Drawing Figures

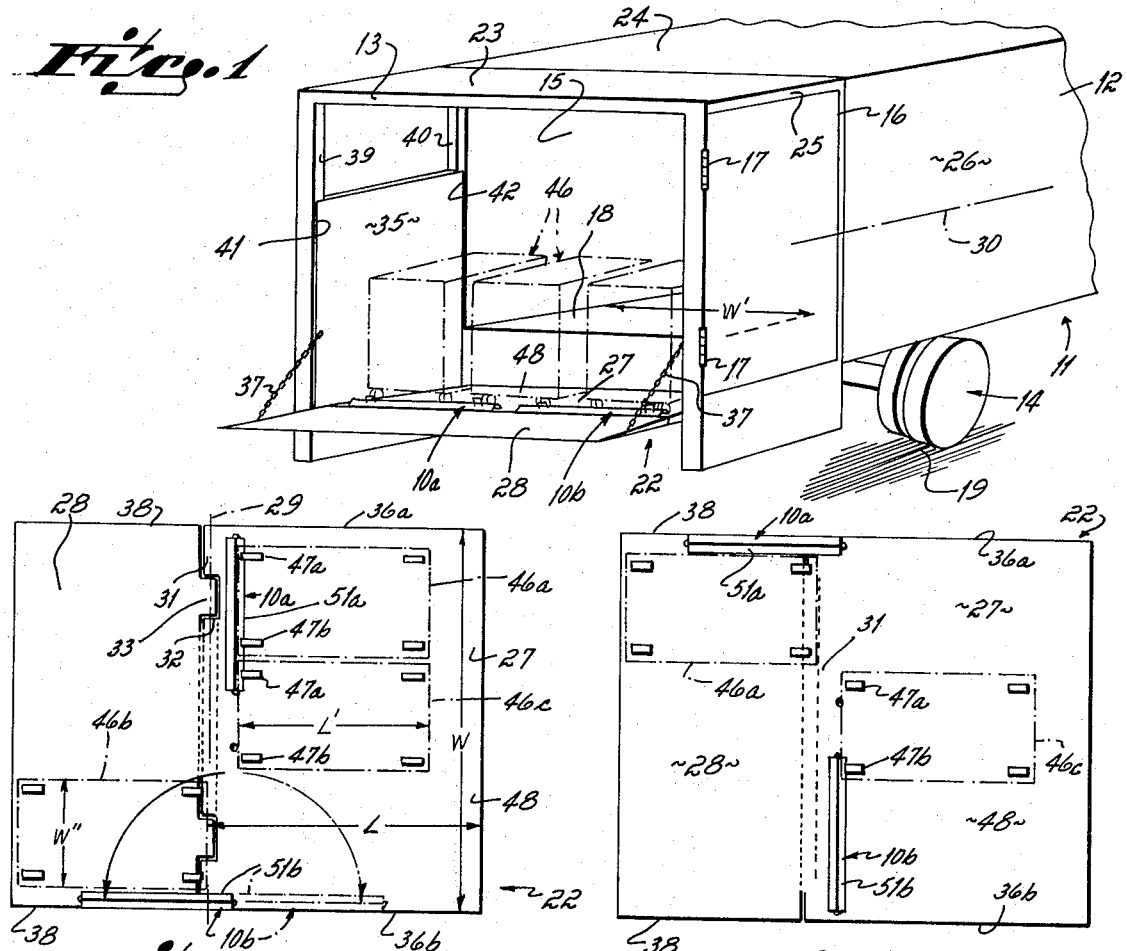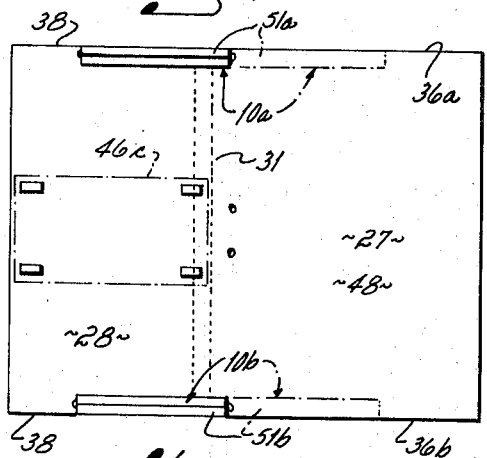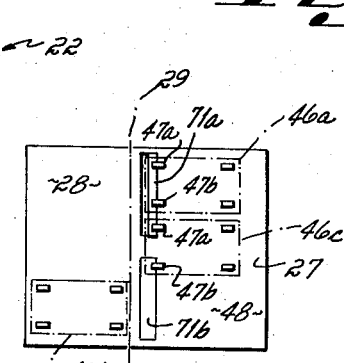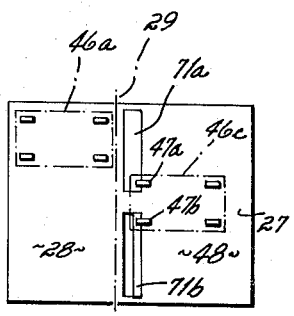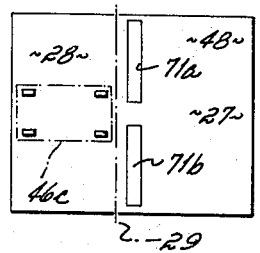

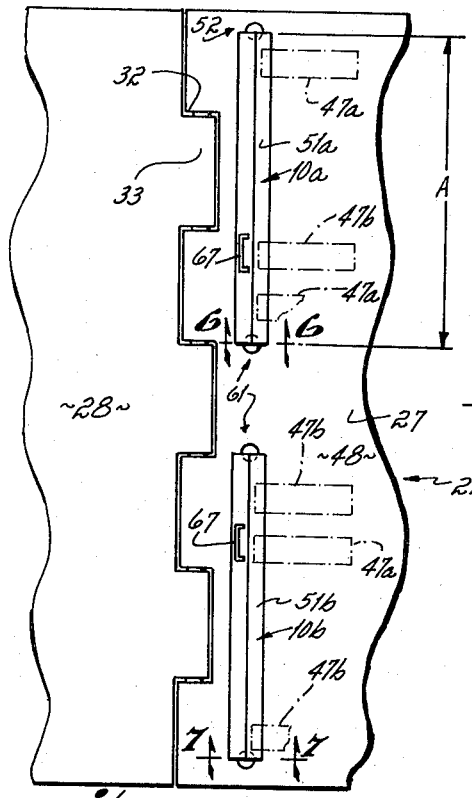
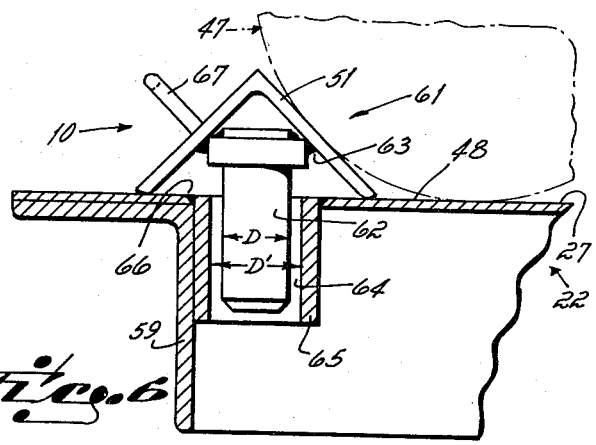
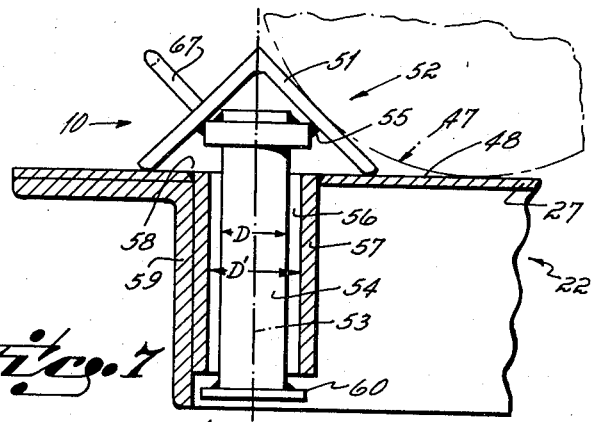
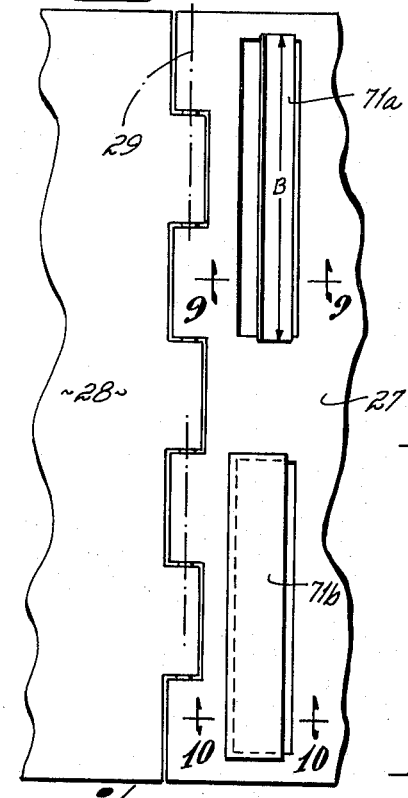
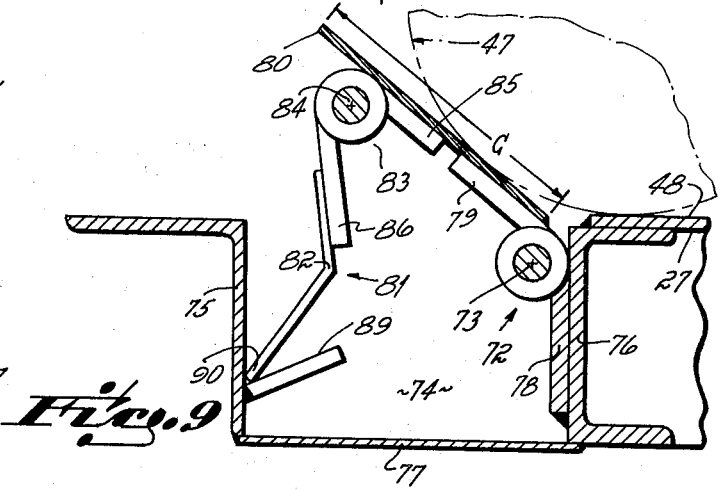
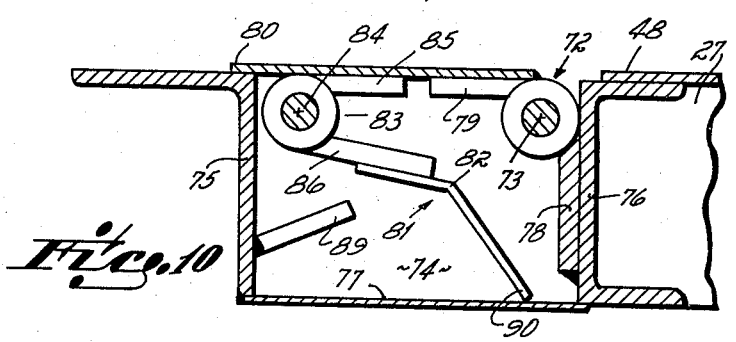

CART STOP STRUCTURE FOR AN ELEVATOR

This invention relates to cart stop sturctures. More particularly, this invention relates to a cart stop structure particularly adapted for use in combination with an elevator.

As is well known, the use of tractor trailer rigs has increased substantially over the years. The trucking industry makes wide use of cargo trailers in hauling freight between relatively widely spaced destinations. Such cargo trailers are, basically, in the nature of a large enclosed room or body having access doors at the rear end thereof. The body is provided with wheels at the rear end thereof, the front end of the body being adapted for interconnection with a so-called tractor which supplies the motor power for the tractor trailer rig.

The body of this well known cargo trailer structure has a floor which is elevated substantially above ground level because of the need for ground clearance during transit and, also, because of the wheels which support the body at the rear end thereof. The fact that the trailer's floor is substantially elevated above ground level makes for problems in the loading of freight into and the unloading of freight from the trailer itself. Historically, there have been two different methods of loading and unloading such cargo trailers. The first method is to provide an elevated loading dock at the warehouse, manufactory, or other facility which the cargo trailer is adapted to serve. The loading dock is located at a level above ground level substantially equal to the level of the trailer's floor above ground level. Thus, motorized equipment can be moved into and out of the trailer's body when the trailer's rear doors are opened and the trailer backed up to the loading dock so as to facilitate loading and unloading of the trailer. The second method is to make use of a forklift type truck for loading and unloading the trailer's body from ground level. The forklife truck is particularly adapted to move palletized freight from ground level onto the trailer's floor, and vice versa, to aid in loading and unloading of the trailer.

More recently, there has been developed an elevator structure which can be incorporated with a trailer's body at the rear end thereof. That is, there has been developed an elevator structure which is mounted directly in the trailer's body at the rear or access opening end of the trailer. The elevator functions like an ordinary elevator in that the elevator's platform is adapted to move between ground level and the trailer's floor level within the confines of the trailer body's side walls and roof. During transit the elevator's platform is simply retained at floor level within the trailer's body. This elevator structure, since it is an integral part of the trailer's body, alleviates loading and unloading problems of the trailer particularly when such must occur in locations where no loading dock or forklift trucks are available. A typical elevator of the type adapted for installation within a trailer's body is particularly illustrated in U.S. Pat. No. 3,371,805.

In the grocery distribution or warehousing industry, cargo trailers are widely used in transporting groceries in bulk from warehouse distribution centers to retail store locations. Retail store locations oftentimes do not have loading dock facilities. Hence, the utilization of a trailer that incorporates an elevator at its rear or access opening end is quite useful in that it allows the trailer to be partially or fully unloaded at one or a number of retail store locations in a rapid and efficient manner. Further, and toward the objective of accomplishing loading and unloading of elevator type cargo trailers efficiently and economically, it is desirable to make use of wheeled carts on which the packaged bulk groceries can be stacked so as to make loading and unloading of the trailers even easier and faster than would normally be the case if pallets were used. Such carts are generally in the nature of a flat bed supported on four wheels at the four corners of the bed, each end of the bed being provided with an upstanding frame to prevent the bulk groceries stacked thereon from falling off. These carts are sized so as to make optimum use of the space within the trailer's body during transport; generally speaking, these carts are sized widthwise so that they fit three abreast, i.e., side-by-side, across the width of a standard size cargo trailer's body. Upon reaching a retail store location, the carts are simply rolled onto the trailer elevator's platform, the platform lowered from the trailer's floor level to ground level, and the carts rolled into the retail store where the goods may be easily removed. Of course, initial loading of trailers at the warehouse is the reverse of this procedure.

A typical cart structure of the type adapted for use in the grocery distribution industry, and of the type particularly useful with a cargo trailer's elevator of the type described above, is illustrated in U.S. Pat. No. Re. 27,683.

In unloading these carts from the trailer's body, and to achieve optimum unloading capacity of the elevator's platform, it is desirable that the carts be placed three abreast on the platform. This for the reason that the elevator's platform is sized lengthwise to receive one cart, and is sized widthwise to extend across the width of the trailer's body. However, the carts are relatively heavy, particularly when fully loaded, and are mounted on wheels as mentioned for mobility purposes. Thus, the carts have a tendency to roll unless watched closely. Since the free or leading edge of the elevator platform is an unguarded edge in effect, it is possible for the carts to roll off that edge and tumble toward ground level unless watched very closely as the elevator platform is being lowered from the trailer's floor level to ground level or vice versa. Heretofore, and to the best of my knowledge, there has been provided no cart stop structure on an elevator of the type adapted to be installed in a trailer's body.

Therefore, it has been one objective of this invention to provide a novel cart stop structure for an elevator that provides the capability of stopping wheeled carts on the elevator's platform from rolling off a free or access edge thereof as the platform is moved from a lower level to a higher level and vice versa.

It has been another objective of this invention to provide a novel cart stop structure for an elevator of the type adapted for mounting at the rear end of a cargo trailer.

It has been a further objective of this invention to provide a novel cart stop structure adapted for use with an elevator of a width and length that accommodate three wheeled carts side-by-side, the cart stop structure being structured such that the carts can be rolled off the elevator's platform one at a time while the carts left on the platform remain chocked.

It has been a further objective of this invention to provide a novel method of unloading carts located three abreast across an elevator's platform mounted in a cargo trailer's body by means of a novel cart stop structure fixed to that platform.

In accord with the principles of this invention, and in the preferred embodiment, there is provided a cart stop structure for an elevator mounted at the rear end of a cargo trailer. Two separate chocks are permanently connected to the elevator's platform, the platform being wide enough to accommodate three carts side by side (as opposed to end to end) across its width. The chocks are movable between a storage position either dropped flush with the platform's floor or pivoted adjacent the platform's side walls, (depending on the specific structural embodiment used) so the carts may be easily rolled onto or off the elevator platform, and an operative position adjacent the platform's free edge in linear relation one with the other where carts on the platform are prevented from rolling off the platform during raising and lowering of the platform. Each chock is of a length sufficient to block both wheels of that cart adjacent its related side of the platform as well as one wheel of the cart in the center of the platform. This allows one side cart and the center cart on the platform to remain chocked while the other side cart is being removed, thereafter allows that one side cart to be removed while the center cart remains chocked, and thereafter allows the center cart to be removed, during unloading of the trailer simply by manipulating the two chocks in a set sequence.

Other objectives and advantages of the invention will be more apparent from the following detailed description taken in conjunction with the drawings in which:

FIG. 1 is a perspective view illustrating the rear or access end of a cargo trailer's body with the doors open and showing an elevator mounted therein, the elevator's platform being located in an intermediate position between the trailer body's floor level and ground level;

FIG. 2 is a top view of the elevator showing the position of a first embodiment of the cart stop structure during unloading of a first cart from the elevator's platform from a series of three carts located side-by-side on the platform;

FIG. 3 is a view similar to FIG. 2 showing the position of the first embodiment of the cart stop structure during unloading of a second cart of the three initially positioned on the platform;

FIG. 4 is a view similar to FIGS. 2 and 3 showing the position of the first embodiment of the cart stop structure during unloading of the third and last cart of the three initially positioned on the platform;

FIG. 5 is a top view of the first embodiment of the cart stop structure, the first embodiment also being the embodiment illustrated in the unloading sequence shown in FIGS. 2–4;

FIG. 6 is a cross-sectional view taken along line 6—6 of FIG. 5;

FIG. 7 is a cross-sectional view taken along line 7—7 of FIG. 5;

FIG. 8 is a view similar to FIG. 5 illustrating a second embodiment of the cart stop structure;

FIG. 9 is a cross-sectional view taken along line 9—9 of FIG. 8;

FIG. 10 is a cross-sectional view taken along line 10—10 of FIG. 8;

FIG. 11 is a view similar to FIG. 2 illustrating the second embodiment of the cart stop structure;

FIG. 12 is a view similar to FIG. 3 illustrating the second embodiment of the cart stop structure; and FIG. 13 is a view similar to FIG. 4 illustrating the second embodiment of the cart stop structure.

One environment in which the cart stop structure 10 of this invention is particularly adapted for use is illustrated in FIG. 1. That environment is a cargo trailer 11 that includes an enclosed body 12 mounted at the rear end 13 on suitable axle and wheels 14 as is well known in the art. The front end (not shown) of the trailer 11 is adapted to hook up with a tractor (not shown) as the power plant for the over-the road hauling, thereby providing a so-called tractor trailer rig. The body's rear end 13 defines an access opening 15 that is closed by rear doors 16 during over-the-road transport of the trailer, the doors being movable between a full closure position (not shown) and a full open position shown in FIG. 1 on vertical hinge lines 17. note that the trailer 11 includes a floor 18 disposed substantially above ground level 19. The rear end 13 of the trailer's body 12 is provided with an elevator 22. The elevator 22 is enclosed by a roof extension 23 of the trailer's roof 24, and side wall extensions 25 of the trailer's side walls 26. The elevator 22 itself is provided with a platform 27 and a ramp 28 hinged thereto, the ramp being hinged on a hinge line 29 transverse to the trailer's longitudinal axis 30 at the load/unload or free or leading edge 31 of the elevator's platform. The platform 27 is provided with a series of slots 32 or grooves along its leading edge 31, and the ramp 28 is provided with a series of tongues 33 adapted to interfit the slots in the platform. Suitable hinge pins 34 interconnect the tongue 33 and slot 32 configuration of the ramp 28 and the platform 27 as is particularly illustrated in FIGS. 5 and 8. The elevator 22 also includes side walls 35 permanently fixed to each side edge 36 of the elevator's platform 27. A chain 37 is adapted to interconnect the side wall 35 and the ramp 28 along each side edge 38 of the elevator ramp 28 so as to maintain the ramp in a horizontal or unloading attitude relative to the platform 27 when the elevator is being used for loading or unloading purposes. A pair of vertical guide masts 39, 40 is fixed to each of the trailer's side walls 26 in spaced relation at the trailer's rear end 13. These pairs of guide masts 39, 40 are adapted to cooperate with the vertical edges 41, 42 of the elevator's side walls 35 for guiding the elevator 22 in its vertical or up-and-down movement path. Vertical up-and-down movement of the elevator is provided by power means, not shown.

As is illustrated in FIGS. 1–4, and as is particularly the case in the grocery distribution industry, cargo trailers 11 of the type generally shown are used to transport carts 46 of bulk groceries from warehouse distribution centers to retail store outlets. The carts 46 are adapted to roll into and out of the trailer 11 over the elevator's platform 28 and ramp 28 over a travel path parallel to the trailer's axis 30. The carts 46 used are generally sized so as to fit three abreast, i.e., side-by-side, within the trailer's body 12 on the floor 18. Since the elevator's platform 27 is of a width W substantially equal to the width W' of the trailer's body 12, i.e., of the trailer's floor 18, such carts 46 can be unloaded three abreast on the platform, see FIG. 1. The elevator's platform length L is at least slightly greater than the length L' of the carts 46. Each cart 46 is provided with wheels 47 at the four corners thereof so as to make them readily mobile onto and off the elevator's platform 27 and, hence, into and out of the trailer's body 12. In use, and when the elevator platform's floor 48 is coplanar with the trailer's floor 18 during either unloading or loading of the trailer's body 12, the carts 46 may be rolled in series of threes onto the platform 27 out of the nonelevator portion of the trailer's body or off the platform 27 into the nonelevator portion of the trailer's body. Of course, when the elevator's platform 27 is disposed at ground level 19 during either loading or unloading of the trailer's body 12, the carts may be rolled in series of threes onto the platform over the ramp 28 prior to being elevated to the floor 18 level of the truck, or off the platform over the ramp onto ground level. As the carts 46 are being raised or lowered by means of the elevator 22, each of the carts presents a pair of wheels 47a, 47b adjacent the leading or free edge 29 of the elevator's platform 27. It is these wheels 47a, 47b of each cart 46 which are chocked by the cart stop 10 structure during loading and unloading of the elevator's platform 27 when the platform is in the raised or trailer floor 18 level position as well as during the raising or lowering of the elevator's platform.

The method and structural concepts common to both specific shock 10 embodiments is illustrated in FIGS. 1-4, even though the chock embodiment shown in those Figures is the first structural embodiment illustrated in detail in FIGS. 5-7. As shown in FIGS. 1-4, two separate chocks 10a, 10b are permanently connected or fixed to the elevator's platform 27, each chock being movable into and out of operational or chock relationship with three carts 46 disposed side-by-side across that platform. The two chocks 10a, 10b are movable into operational relation i.e., into a use attitude, adjacent the rear or free edge 29 of the elevator's platform 27 so as to prevent any or all of the three carts 46 from rolling over that edge 29 when the platform is being raised and lowered in elevator fashion as well as when the platform is being loaded, see FIG. 1. In the use attitude shown in FIG. 1, the two chocks 10a, 10b are coaxially disposed in parallel fashion with the platform's rear edge 29. The two chocks 10a, 10b are movable out of operational relationship into a storage attitude after the elevator 22 has been lowered to ground level so that the carts 46 on the elevator's platform 27 can be rolled off into, e.g., a warehouse during unloading of the trailer 11, or so that three carts can be rolled onto the platform during loading of the trailer. Note particularly that each of the two chocks 10a, 10b is of a length that allows it to function as a chock for a pair of wheels 47 on that cart 46a, 46b adjacent that side 36a, 36b, respectively, of the elevator's platform 27 which it serves, as well as one wheel of the center cart 46c on the platform. That is, each chock 10a, 10b may provide a chock function for as many as three wheels 47 of two side-by-side carts when the chock is disposed as shown in FIG. 1, two of the wheels being on one side cart 46a or 46b and one of the wheels being on the center cart 46c.

Unloading of the elevator's platform 27 at ground level, when same is loaded with three side-by-side carts 46 that are chocked in place as shown in FIG. 1, is particularly illustrated in FIGS. 2-4. As can be seen in FIG. 2, and when it is desired to remove a first one of the three carts 46 from the platform 27, one of the chocks 10b is moved out of chocking relationship into a storage attitude so that first side wall cart 46b can be rolled off the platform down the ramp 28. This leaves the other side wall cart 46a fully chocked, and the center cart 46c partially chocked, i.e., only the wheel 47a of center cart 46c is chocked, by the other chock 10a. Subsequently, and as illustrated in FIG. 3, second side wall cart 46a is rolled off the platform 27 after the first chock 10b has been moved back into chocking relationship and the second chock 10a has been moved out of operational relationship into a storage attitude. This leaves the center cart 46c chocked even though only wheel 47b of the center cart is chocked by chock 10b. Thereafter, the first chock 10b is moved out of operational relationship back into the storage attitude so that the center cart 46c can be rolled off the platform 27, too. Thus, all three carts 46 can be moved off the elevator's platform 27 one at a time while the other cart(s) remaining on the platform remain chocked thereon simply by manipulating the two chocks 10a, 10b in a set sequence of steps. Alternatively, and upon loading the elevator's platform 27 with three carts 46 when the elevator 22 is at ground level 19, the carts can be loaded onto the platform one at a time and chocked thereon until all three carts are established on the platform simply by reversing the sequence of steps illustrated in FIGS. 2-4.

First Embodiment of Cart Stop Structure

The first embodiment of the cart stop 10 structure is illustrated in FIGS. 5-7, and the operational sequence thereof is illustrated in FIGS. 2-4. As shown in FIG. 5, each of the two separate chocks 51a, 51b is in the nature of a bar having an inverted V-shaped configuration. Each chock bar 51a, 51b is of a length A such that, when in the coaxial chocking attitude with the other associated bar as illustrated in FIG. 5, the chock bar is adapted to act as a chock for both wheels 47a, 47b of its related side wall cart 46a, 46b, respectively, and one wheel of the center cart 46c.

Each chock bar 51a, 51b is permanently pinned at end 52 to the elevator's platform 27 adjacent its respective side wall edge 36a, 36b, respectively, in a manner that allows it to swing 180° on a vertical axis 53 from a permanent storage position (see chock 10b illustrated in phantom lines of FIG. 2) flush with the platform's related side edge 36b to a temporary storage position (aee chock 10b illustrated in solid lines of FIG. 2) flush with the ram's related side edge 38, as well as to a use or operational chock position (see chock 10a illustrated in FIG. 2) parallel to the hinge line 29 of the platform. At the permanently pinned end 52 of each chock bar 51a, 51b, a hinge pin 54 is welded to the underside of the inverted V-shaped chock bar as at 55, and is received in a hole 56 defined by a collar 57 welded as at 58 to the platform's floor 48 adjacent a floor support member 59. Each permanent pin 54 is provided with a flange 60 welded to its bottom end, thereby preventing the permanent pin from being withdrawn out of operational relationship with the platform's floor 48 so as to permanently connect each chock bar 51a, 51b to the platform 27. The free or swinging end 61 of each chock bar 51a, 51b is provided with primary latch means in the form of a latch pin 62 also welded as at 63 to the underside of the inverted V-shaped chock bar. Each latch pin 62 is also adapted to be received in secondary latch means in the form of a hole 64 defined by a collar 65 welded as at 66 to the platform's floor 48 (the floor being reinforced by angle member 59), thereby retaining each chock bar 51a, 51b in the chocking attitude against carts 46 on the elevator's platform 27 to prevent same from rolling off the platform. Note particularly that the outside diameters D of the free pin 62 and the permanent pin 54 are substantially less than the inside diameters D' of the collars 57, 65, respectively, with which they are associated. This sloppiness of fit between 54, 62 54,62 and collars 57, 65, respectively, allows the free end 61 of each swinging bar 51a, 51b to be lifted sufficiently so as to permit removal of the free pin 62 from its associated collar 65, thereby permitting each chock bar to swing as shown in FIGS. 2–4. On the other hand, this fit between pins 54, 62 and collars 57, 65 is not so sloppy as to defeat the chocking purpose of the chock bars 51a, 51b when same are in the chocking position shown in FIG. 1. A handle 67 is provided on each chock bar 51a, 51b adjacent its free end 61 to allow easy manual transfer of the chock bars between storage and chock attitudes.

Use of this first embodiment is particularly illustrated in FIGS 2–4; those same figures were also used to describe the broader aspects of this invention heretofore. The fully chocked attitude of the two separate chock bars 51a, 51b is illustrated in FIGS. 1 and 5 where the bars are shown coaxially aligned one with the other adjacent the free or leading edge 31 of the elevator's platform 27. In this posture, three carts 46 can be placed on the platform side-by-side (as opposed to end-to-end) with all the wheels 47 of all the carts being fully chocked where those carts are of a width W'' to make optimum use of the elevator's platform width W. In this fully chocked attitude the elevator's platform 27 may be raised or lowered, of course, without fear of the carts 46 rolling off the platform's edge 31 onto the ramp 28 with the dangers attendant thereto. Once the elevator's platform 27 has been lowered to ground level, a first chock 51b is swung about vertical axis 53 from that attitude illustrated in FIGS. 1 and 5 to the solid line attitude illustrated in FIG. 2 by using its handle 67 to lift its free pin 62 out of floor hole 64 and to pivot the chock bar 51b about its fixed pin 54. This position allows a first side wall cart 46b to be rolled off the platform 27 over the ramp 28 and onto ground level 19. After the cart 46b has reached ground level 19 the first chock 51b is swung back into the chocking attitude, and the second chock 51a is swung on its vertical axis 53 from the chocking attitude to a storage attitude flush with the ramp's side edge 38, as illustrated in FIG. 3. In this intermediate posture of the chock bars 51a, 51b, the second side wall cart 46b can be easily rolled off the platform 27 over the ramp 28 and onto ground level 19 while the center cart 46c remains chocked because of its wheel 47a being engaged by the first chock 51b. Thereafter, the first chock bar 51b is once again swung into the storage attitude where same overlies the ramp 28 so as to allow the center cart 46c to be rolled off the platform 27 over the ramp onto ground level 19, see FIG. 4. When no carts 46 are disposed on the elevator's platform 27, storage of the swinging chock bars 51a, 51b may occur in one of two general postures. Either the chock bars 51a, 51b may be swung to the fully chocked attitude illustrated in FIG. 5 where same are coaxially aligned and disposed parallel to the leading edge 31 of the elevator's platform 27, or same may be swung parallel to the platform's edges 36 where same fully overlie the platform as illustrated in phantom lines in FIG. 4.

Second Embodiment of Cart Stop Structure

The second embodiment of the chock structure is illustrated in FIGS. 8–13.

The chock structure of this second embodiment also includes two separate chocks 71a, 71b, but each of these chocks is in the nature of a plate adapted to be raised out of, and lowered or dropped into, planar relation with the elevator platform's floor 48. Each plate 71a, 71b is permanently hinged, as by hinges 71, to the elevator's platform 27 along a horizontal axis 73 disposed parallel to the hinge line 29 defined by the hinged connection of the platform and the ramp 28, and is located closely adjacent to that hinged connection. Each plate 71a, 71b is of a length B similar to the length A of the chock bars 51a, 51b of the first embodiment, i.e., of a length adapted to provide a chocking function for both wheels 47a, 47b of an adjacent side wall cart 46a or 46b, as well as one wheel 47a or 47b, respectively, of the central cart 47c, when same are positioned on the elevator's platform.

Each chock plate 71a, 71b cooperates with a well 74 defined in the elevator's platform beneath the floor level thereof, the well being defined by cross platform brace members 75, 76, as well as by baseplate 77, as illustrated in FIGS. 9 and 10. The hinge 72 which supports each elongated chock plate 71a, 71b has one arm 78 welded to brace member 76 of the platform 27 and another arm 79 welded to the underside of the chock plate. Note that the width C of each chock plate 71a, 71b is such that, when same is disposed in planar relation with the platform's floor 48, the leading or free edge 80 of the chock plate overlies the floor so as to maintain the chock plate in substantially planar relationship with the floor when same is dropped flush with the floor and so as to close the well 74.

A latching device 81 is provided for each chock plate 71a, 71b to hold that plate in the upraised or chocking attitude as illustrated in FIG. 9. This latching device 81 includes a dogleg latch 82 and is connected by hinge 83 to each chock plate 71a, 71b adjacent the leading or free edge 80 thereof, the axis 84 of hinge 83 being parallel to the axis 73 of hinge 72. Arm 85 of the hinge 83 is welded to the underside of the associated chock plate 71a, 71b, and arm 86 is welded to the dogleg latch 82. The dogleg latch 82 has a center of gravity arranged such that, as the plate is lifted up into the chock position illustrated in FIG. 9, the dogleg 82 swings into contact with the leading wall 75 of the well 74. The chock plate 71a, or 71b itself, as will be recalled, is hingedly connected to the trailing wall 76 of the well 74. The well's leading wall 75 is provided with a ledge or stop 89 that extends outwardly therefrom and that is raised above the well's baseplate 77. After the swinging edge 90 of the dogleg 82 has been lifted up over the ledge 89 by pivoting the chock plate 71a or 71b toward a vertical attitude, the chock plate is thereafter lowered until the dogleg is trapped on the ledge, thereby holding the chock plate in a partially erected or chock-type attitude where it is upraised substantially out of its usual horizontal storage position relative to the elevator platform's floor 48.

The storage attitude of the drop flush chock plates 71a, 71b is illustrated in FIG. 10. To achieve the storage attitude each chock plate 71a, 71b is simply lifted slightly toward vertical from its chocking attitude illustrated in FIG. 9 until the swinging edge 90 of the dogleg latch 82 can clear the stop ledge 89 provided on the well's leading wall 75. When such clearance has been obtained, the dogleg latch 82 is simply kicked toward the well's trailing wall 76 and the chock plate 71a or 71b lowered simultaneously toward planar relation with the elevator platform's floor 48. The dogleg latch's swinging edge 90 will thus contact the well's bottom plate 77 causing same to pivot into the storage attitude illustrated in FIG. 10 where the chock plate is, in fact, disposed in planar relation with the platform's floor 48.

Use of the second structural embodiment 71a, 71b of the cart stop structure is the same as use of the first structural embodiment 51a, 51b in terms of chocking and storing sequence when unloading carts from or loading carts onto the elevator's platform 27 at ground level. The first step of the ground level unloading sequence for three carts suitably chocked on the platform 27, as illustrated in FIGS. 8 and 11, involves dropping the first chock plate 71b flush with the platform's floor 48 as shown in FIGS. 10 and 11 so that the first side wall cart 46b can be rolled off the platform over the ramp 28 and onto the ground. Subsequently, the first chock plate 71b is lifted out of its storage attitude into the chocking attitude illustrated in FIGS. 9 and 12 (the dogleg latch 82 being captured on the ledge 89 so as to hold the chock plate 71b in the upraised attitude), and the second chock plate 71a lowered into the storage attitude flush with the floor 48. In this posture of the chock plates 71a, 71b, the second side wall cart 46a may be rolled off the platform 27 over the ramp 28 and onto the ground while the center cart 46c remains chocked by means of the first chock plate 71b engaging the one wheel 47b on that center cart. Thereafter, as shown in FIG. 13, both chock plates 71a, 71b are dropped flush with the floor 48 into the storage attitude so as to allow the center cart 46c to be removed from the elevator's platform 27 over the ramp 28. Of course, in loading of carts 46a–c onto an empty elevator's platform 27 at ground level the reverse of this step sequence may be followed. During over-the-road travel of the trailer, the drop flush chocks 71a,71b may be either maintained in the chocking attitude illustrated in FIG. 9, or may be dropped flush into the storage attitude illustrated in FIG. 10.

Having described in detail the preferred embodiments of my invention, what I desire to claim and protect by Letters Patent is:

1. An elevator platform of a width adapted to carry three separate wheeled carts side by side, said platform including
   two separate chocks, each of said chocks being of a length sufficient to block both wheels of that cart adjacent its related side of said platform as well as one wheel of that cart in the center of said platform, and
   a hinge connecting each of said chocks to said platform, said chocks being independently movable between a storage position that allows the carts to be rolled off said platform and an operative position adjacent the platform's free edge where the carts are prevented from rolling off said platform.

2. an elevator platform as set forth in claim 1, said chocks being permanently connected to said platformm, and said chocks being swingable on a vertical axis between a chocking attitude where same are disposed transverse to the travel path of said wheeled vehicles and a storage attitude where same are disposed parallel to the travel path of said vehicles.

3. An elevator platform as set forth in claim 1, said chocks being permanently connected to said platform, said chocks being swingable on a horizontal axis between a chocking attitude where same are upraised into the travel path of said wheeled vehicle and a storage attitude where same drop flush with the platform's floor.

4. An elevator platform as set forth in claim 1 wherein said elevator platform is mounted at the rear end of a cargo trailer, said platform being adapted to move between floor level of said trailer and ground level, said chocks serving to maintain said carts on said platform during loading and unloading of said trailer.

5. An elevator platform of a width adapted to hold a wheeled vehicle during up and down operation of said platform, said platform comprising
   a chock bar permanently connected to a floor surface of said platform, said permanent connection permitting movement of said chock bar on a vertical hinge line between chocking attitude where said chock bar is located transverse to the travel path of said wheeled vehicle across said floor and a storage attitude where said chock bar is located parallel to the travel path of said wheeled vehicle, and said permanent connection comprising a hinge pin fixed to the underside of said chock bar, said hinge pin being received in permanent pivot relationship with said floor, primary latch means fixed to said chock bar, said primary latch means on said chock bar cooperating with secondary latch means in said floor to insure that said chock bar is retained in chocking attitude when disposed in the chocking attitude, and said primary latch means including a latch pin fixed to the underside of said chock bar and said secondary latch means including structure defining a hole in said floor, and
   said latch pin and hinge pin each cooperating with a coller fixed to said floor, the diameter of said hinge and latch pins relative to the diameter of said collars providing a sloppiness of fit that allows said chock bar to be easily lifted out of chocking attitude and swung to storage attitude, and vice verse.

6. A chock structure as set forth in claim 5 including a handle at the swinging end of said chock bar, said handle allowing said chock bar to be easily lifted and swung from storage to chocking attitude as desired.

7. A chock structure as set forth in claim 5, said chock bar being hingedly connected to an elevator's platform adjacent the free edge thereof, and including
   a ramp hingedly connected to the free edge of said platform, said chock bar being adapted to overlie and be supported by said ramp when in the storage attitude and being aligned parallel with the platform's free edge when in the chocking attitude.

8. An elevator platform of a width adapted to hold a wheeled vehicle during up and down operation of said platform, said platform comprising
   a chock plate connected to a floor surface of said platform along a hinged edge thereof, said plate being adapted to pivot on a horizontal axis between a storage attitude where same is angularly upraised with respect to said floor and disposed transverse to the travel path of said wheeled vehicle,
   a latch plate hingedly connected adjacent the free edge of said chock plate, said latch plate being movable relative to said chock plate as said chock plate is pivoted between storage and chocking attitudes, a well provided in said floor within which said latch plate is positioned when said chock plate is in the storage attitude, thereby permitting said chock plate to lie flush with said floor, and immobile ledge means fixed to one side wall of said well, said latch plate being provided with a center of gravity such that said latch plate pivots toward that side wall of said well which mounts said ledge means as said chock plate is raised, said latch plate being trapped on said ledge means upon lowering said chock plate after said latch plate has been raised sufficiently to clear said ledge means initially, thereby restraining said chock plate in an angularly upraised position.

9. A chock as set forth in claim 8 wherein said chock plate is hingedly connected to the upstream wall of said well relative to the travel path of said wheeled vehicles and wherein said ledge means is connected to the downstream wall of said well relative to that travel path.

* * * * *